US009791878B2

(12) United States Patent
Hau

(10) Patent No.: US 9,791,878 B2
(45) Date of Patent: Oct. 17, 2017

(54) DIGITAL VOLTAGE CONTROLLER

(71) Applicant: King Kuen Hau, Hong Kong (CN)

(72) Inventor: King Kuen Hau, Hong Kong (CN)

( * ) Notice: Subject to any disclaimer, the term of this patent is extended or adjusted under 35 U.S.C. 154(b) by 432 days.

(21) Appl. No.: 14/418,953

(22) PCT Filed: Aug. 2, 2013

(86) PCT No.: PCT/IB2013/056337
§ 371 (c)(1),
(2) Date: Feb. 2, 2015

(87) PCT Pub. No.: WO2014/020572
PCT Pub. Date: Feb. 6, 2014

(65) Prior Publication Data

US 2015/0241900 A1 Aug. 27, 2015

Related U.S. Application Data

(60) Provisional application No. 61/678,683, filed on Aug. 2, 2012.

(51) Int. Cl.

| | |
|---|---|
| ***G05F 3/08*** | (2006.01) |
| ***G05F 1/14*** | (2006.01) |
| ***G05F 3/04*** | (2006.01) |
| ***H02J 1/00*** | (2006.01) |

(52) U.S. Cl.
CPC .................. *G05F 3/08* (2013.01); *G05F 1/14* (2013.01); *G05F 3/04* (2013.01); *H02J 1/00* (2013.01); *Y10T 307/685* (2015.04)

(58) Field of Classification Search
CPC ........................................................ G05F 3/08
USPC ........................................................ 307/77
See application file for complete search history.

(56) References Cited

U.S. PATENT DOCUMENTS

| | | | | |
|---|---|---|---|---|
| 5,710,504 A * | 1/1998 | Pascual | ................. | H02J 7/0018 180/65.8 |
| 2012/0161526 A1* | 6/2012 | Huang | ...................... | G05F 1/67 307/77 |
| 2014/0312700 A1* | 10/2014 | Catthoor | ........... | H01L 31/02021 307/77 |

* cited by examiner

*Primary Examiner* — Joseph Chang

(57) ABSTRACT

A high-efficiency digital voltage controller capable of providing monotonically-varying stepwise voltage, said controller comprises of a plurality of two-terminal voltage modules connected in series; within each module one or more two-terminal voltage cells of identical voltage each and connected in series; within each module a plurality of switches controllable to connect any number of the voltage cells in series to the output terminals of the voltage module; the ratios of the magnitudes of voltage of any one voltage cell between the voltage modules being substantially equal to integer values uniquely defined by present invention, according to the numbers of voltage cells in each of the voltage modules; said plurality of switches being controlled by a control module implemented in any suitable logic.

12 Claims, 3 Drawing Sheets

DIGITAL VOLTAGE CONTROLLER

BACKGROUND OF THE INVENTION

Field of Invention

The present invention relates generally to electrical circuits for voltage control, and more particularly, to digital circuits for voltage control, and hence delivery of power, to electrical loads.

Description of the Related Art

Electrical devices and appliances are generally designed to operate at specific power supplies in terms of voltage magnitude and frequency, and other properties. When in use, any deviation from the specified powering conditions could render the devices or appliances inefficient, inoperative or even permanently defective.

Therefore, ever since human deployment of electricity, it is a common goal of electrical and electronics engineers and scientists to develop devices and methods to control and deliver electrical power to the loads efficiently. Various inverters, converters, voltage regulators, power amplifying and power switching components, electrical sensors, etc. are invented and developed to increase the capabilities in electrical power control, in terms of energy efficiency, control accuracy, response speed, power level and system cost, etc.

In practice, electrical voltage control techniques are employed to control electrical parameters other than voltages. For example, by controlling the voltage applied to a constant impedance device, current through the device is controlled. As another example, by controlling the voltage applied to a load, the power generated by the load is controlled. Thus in practice electrical voltage control apparatus functions in many different forms and in many different application areas, such as:

1 Variable voltage supplies, such as those as voltage references for calibration and testing
2 Variable current supplies, such as those as current references for calibration and testing
3 Voltage regulators, such as mains voltage regulators for powering electrical appliances
4 Current regulators, such as those for powering LED lamps
5 Power regulators, such as those for thermal control Broadly speaking, we may define two distinct methods in voltage control, namely analogue and digital approaches. By analogue approach, voltages are scaled up or down continuously through any voltage levels within the control range. By digital approach, to be called Digital Voltage Control throughout this specification, voltage levels are "stepped" through discrete levels within the control range. One common way is, as often used for AC mains regulation, through switching in and out of transformer coils as "voltage cells", i.e. voltage sources which are in galvanic-isolation from each other.

There are a number of merits of digital approach over the analogue approach. The analogue approach is through linear control of active electronic devices such as transistors operating in the linear mode, or through circuit switching by active electronic devices such as transistors operating in the switching mode. By linear mode of operation, voltage control can be achieved with high control accuracy and high control speed but at the cost of low power efficiency. By switching mode of operation, voltage control can be achieved with high power efficiency but often with compromised control accuracy and control speed. For very high power applications, the analogue approach, either in linear or in switching mode, faces the difficulties of very high cost or unavailability of suitable active high power or high frequency devices. Further there are more EMI and EMC issues in association with high power and high frequency switching.

The digital approach as adopted by present invention is through switching in and out of "voltage cells" at the usually low power frequency (such as the 50 or 60 Hz mains frequency, or even DC) of the voltage under control, rather than at very high frequencies. Demand on switching speed of the switching devices as well as on the control schemes are not high in general, even at very high power levels. Further, as switching is performed at low frequencies, the issue on EMI or EMC is relatively less serious and might be more easily handled. The digital approach is therefore a better choice to the analogue approach when power-handling capacity and low cost are the prime considerations. Moreover, since the switching loss at low frequency is relatively low, the digital approach enjoys also the benefits of high power efficiency. Furthermore, that no and little distortion is introduced through switching is yet another advantage by the digital approach as compared to the analogue approach.

However, there is still a very important aspect of voltage control or regulation to be considered, namely the accuracy of control. Since by the digital approach, the voltage is varied by steps, the accuracy of control is always limited by the size of the voltage steps. It is obvious for a fixed range of voltage control, the fineness of control is inversely proportional to the number of voltage levels that could be "stepped" through. It is also obvious that for a fixed number of voltage levels, all voltage steps should be made equal to achieve the highest accuracy of control.

When the number of steps is increased for the purpose of achieving finer control, the number of switches required will inevitably increase. Since the switches are the key and relatively expensive components of the system, accuracy of control has often been compromised for lowering the system cost by limiting the number of switches deployed. This is highly undesirable and many different varieties of switching circuit topologies and control methods have been attempted in the past to achieve higher control accuracy while limiting the number of switches employed for circuit simplicity and cost reduction. However these existing designs are in general complicated in overall system structure, restrictive in deployment and often overly complicated in control methodology.

Further, when fine steps are achieved for high control accuracy, a new challenge of maintaining system stability will be in front of the designer. Dependent of the actual circuit design and the accuracy in circuit implementation, monotonicity between the digital control signal and the controlled step voltage output would be lost as the size of the steps decreases to some extent. Consequently, lack of monotonicity causes system instability and also reduction in control accuracy.

While piecemeal improvements or alterations are revealed in many prior inventions, none has actually proposed a unified approach to address the above issues. The present invention is intended to solve all these problems and it will become clear when the invention is disclosed herewith exemplary embodiments.

Prior arts in the voltage control or regulation are found typically in AC voltage regulators, whereby many methods and devices are developed to control the AC voltage through digital approach, and some are revealed by the following patents:

CN201149665
CN201251718

CN201281825
CN201805273
CN201984364
CN201984365
CN201984366
GB1300229
GB2324389
U.S. Pat. No. 3,970,918
U.S. Pat. No. 4,178,539
U.S. Pat. No. 4,716,357
U.S. Pat. No. 4,896,092
U.S. Pat. No. 5,545,971
U.S. Pat. No. 5,932,997
U.S. Pat. No. 6,137,277
U.S. Pat. No. 6,417,651
U.S. Pat. No. 7,816,894
U.S. Pat. No. 7,800,349
US20110043182
US20110273149

In majority of the above inventions and disclosed embodiments, the circuit topologies proposed tend to be very specific and hence very restrictive. The restrictiveness in circuit topologies has presented difficulties to the designer in optimizing the performance of the voltage regulator under practical considerations, such as the difficulty in deciding the best number of voltage modules, the best number of voltage cells in each voltage module (such as the number and turns of transformer coils in the design of transformers for tap-switching voltage regulators), the best number of switches in each voltage module, the most suitable control methodologies and control modules, etc. Consequently, there is a lack of design flexibility for optimizing the performance of the voltage regulator in terms of accuracy of control, voltage range of control, speed of response, cost of implementation, and cost of maintenance, etc.

Further, linearity and monotonicity of the voltage variation are not generally addressed. In many of the inventions, the equal voltage steps are not achieved or not even intended to be achieved. The step sizes are simply not constant by design in these inventions. The result is that the voltage change is non-linear or even worse, not monotonic. Non-linearity will lower the control accuracy achievable, while non-monotonicity will render a feedback control system unstable. Both are detrimental to the performance of the digital voltage control system.

Further still, none of the prior inventions has addressed the issues on the practical limitations affecting the linearity and monotonicity of the voltage under digital control. Consequently the performance of the digital voltage control system, in terms of control accuracy and system stability, is likely compromised due to the oversight of this aspect in system design.

In most cases, prior art designs fail to show the ideal or the preferred theoretical ratios of the voltage cells. In a number of cases, some ratios are proposed without any reasoning as how these ratios are arrived at. Consequently there is no guidance in design to optimize the system, in terms of control accuracy and control range, through proper selection by design the number and magnitude of the voltage cells, and the voltage ratios between the voltage cells.

As will be clear from the following detailed description, the present invention adopts a unified approach to address the above issues not sufficiently addressed before. Apart from practical limitations of components available, there is no restriction by the present disclosed approach in designing the voltage controller in terms of control accuracy, number of switches deployed, number and magnitude of voltage cells. The method of control and the associated control circuitry is simple and straight forward, while the practical limitations affecting the linearity and monotonicity will be addressed to have its consequent bad effects removed too. This will be explained in details with disclosed embodiments for illustration.

Despite that above quoted prior arts dual with transformer tap-switching voltage regulators or controllers, whereby independent transformer coils are depicted as voltage cells in galvanic-isolation, the present invention applies to any other electrical voltage sources in any forms (named "voltage cells" throughout this patent specification) such as these quoted below as examples:

- Electrochemical battery cells
- Solar cells
- Fuel cells
- Thermopiles
- Power transformers energized by supply voltage
- Electricity generators Furthermore, by the duality property of electrical circuits, the present invention can be applied also to electrical current control, as will be explained in more details.

SUMMARY OF THE INVENTION

The objective of the present invention is to provide the apparatus and method of controlling the output of a voltage supply, through digital circuit switching of a combination of voltage sources, to vary in a series of voltage steps accurately and speedily within a predetermined control range. It is a design target to have all the steps of equal magnitudes. Any deviation in practice from the target would need to be kept within a maximum value such that any of the controlled change of the output of the voltage supply within the control range is always monotonic, i.e. the output of the voltage supply always increases or remains constant as the value representing the digital input increases, while the output of the voltage supply always decreases or remains constant as the value representing the digital input decreases. Monotonicity is an essential characteristic for stability within a control system.

DESCRIPTION OF THE DRAWINGS

With the foregoing in view, as other advantages as will become apparent to those skilled in the art to which this invention relates as this patent specification proceeds, the invention is herein described by reference to the accompanying drawings forming a part hereof, which includes descriptions of typical embodiments of the principles of the present invention, in which.

DETAILED DESCRIPTION OF THE INVENTION

Figure 1:
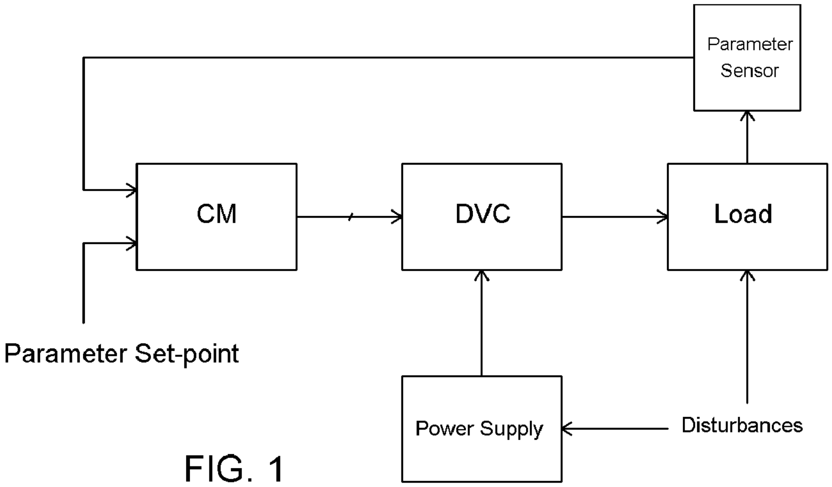
FIG. 1 depicts a basic architecture of a feedback control system deploying a digital voltage controller as an embodiment of the present invention.

Glossary
VM Voltage Module $M_{VM}$ Total number of VMs
$T_{o1}$, $T_{o2}$ The two output terminals a Voltage Module VM
$VM_m$ $m^{th}$ VM, m=1 to $M_{VM}$
$V_{mo}$ Nominal Voltage Output from $m^{th}$ VM, m=1 to $M_{VM}$
DVC Digital Voltage Controller
$V_{DVC}$ Voltage Output from DVC, Digital Voltage Controller=vector sum of voltages from all $M_{VM}$ VMs
$\delta V_{DVC}$ Deviation from the normal value of $V_{DVC}$
VC "Voltage Cell", which is a voltage source
$VC_{mc}$ $c^{th}$ VC in $m^{th}$ VM, c=1 to $N_m$, m=1 to $M_{VM}$
$N_m$ Number of VCs in the $m^{th}$ VM, m=1 to $M_{VM}$
$V_{mc}$ The nominal voltage of the $c^{th}$ VC in $m^{th}$ VM, c=1 to $N_m$, m=1 to $M_{VM}$
$\delta V_{mc}$ Deviation from the value of $V_{mc}$
$V_m$ The nominal voltage of each of the $N_m$ Voltage Cells in the $m^{th}$ VM, m=1 to $M_{VM}$
$\delta V_a$ The largest voltage deviation from the nominal voltage for any of the Voltage Cells VCs in all voltage modules VMs
$S_{mi}$ The $i^{th}$ switch in the S-series of switches in $VM_m$, i=1 to $N_m+1$
$J_{mi}$ The $i^{th}$ switch in the J-series of switches in $VM_m$, i=1 to $N_m+1$
CM Control Module
CC Counter Controller
$C_{sm}$ Counter for driving the Series-S switches in the $m^{th}$ Voltage Module $VM_m$
$C_{Jm}$ Counter for driving the Series-J switches in the $m^{th}$ Voltage Module $VM_m$
$CS_s$ Control signal for the Series-S switches
$CS_J$ Control signal for the Series-J switches
$CS_{sm}$ Control signal for the Series-S switches in the $m^{th}$ Voltage Module $VM_m$
$CS_{Jm}$ Control signal for the Series-J switches in the $m^{th}$ Voltage Module $VM_m$
$V_{reg}$ Output of the Voltage Regulator
$V_{sense}$ Sensed or measured voltage
DIC Digital Current Converter
IM Current Module
IC Current Cell The present invention falls into the specific area of Digital Voltage Control. In FIG. 1, how a Digital Voltage Controller, DVC in abbreviation, plays a role in a feedback control system is illustrated. As in any control system, the parameter(s) of control is first defined. The parameter can be any electrical or physical quantity intended to be controlled, such as electrical voltage, electrical current, electrical power, or physical parameters that can be controlled through electrical means, such as temperature, brightness of illumination, pressure, force, speed, etc., etc. As shown, the parameter in control is measured through the senor, such as the voltage across the load, such as the current through the load, such as the power dissipated by the load, or such as the temperature being controlled via the heating effect of the load. The measured value is converted into a signal, suitably conditioned by general electronic means, and compared to the parameter set-point which defines the desired value of the parameter to be achieved. The result of comparison, showing the departure of the controlled Parameter from the set-point, will trigger the Control Module CM, being implemented in any suitable logic, to provide control signals for turning on and turning off each of the plurality of power switches respectively within the Digital Voltage Controller DVC so as to control the voltage output of said Controller in a way to minimize the departure of the controlled Parameter from the set-point, despite of any variations in the power supply or any variation in the load or any other external Disturbances. Consequently the Parameter is regulated as intended.

Figure 2:
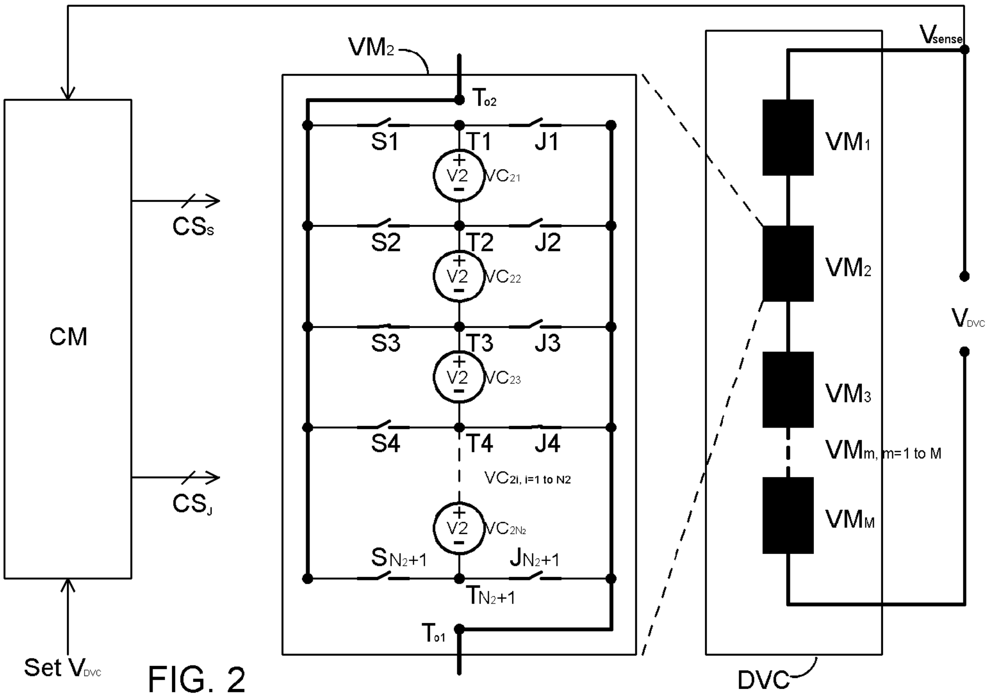
FIG. 2 shows the basic architecture of a digital voltage controller as an embodiment of the present invention.

As shown in FIG. 2, the Digital Voltage Controller DVC consists of one or more Voltage Modules VMs connected in series to provide a controlled voltage output $V_{DVC}$, the total number of VMs being $M_{VM}$. Each of the $M_{VM}$ Voltage Modules having two output terminals, $T_{o1}$ and $T_{o2}$. The second Voltage Module $VM_2$ is shown as an example with more details as described below.

Within each of the Voltage Modules VMs, there are one or more Voltage Cells VCs as voltage sources connected in series aiding, the Voltage Cells VCs being in galvanic isolation before said connection, the total number of VCs in the $m^{th}$ Voltage Module VMs being $N_m$, where m=1 to $M_{VM}$.

Within each of the Voltage Modules VMs, all the Voltage Cells VCs provide voltages identical in magnitude, in waveform and in phase. In other words, The nominal voltages of the Voltage Cells VCs $V_{m1}=V_{m2}=V_{m3} \ldots =V_{mc}$ where c=1 to $N_m$, for any of the Voltage Module VM. The value of the identical voltage is designated $V_m$ as the nominal voltage in the $m^{th}$ Voltage Module $VM_m$.

Within each of the Voltage Modules VMs, all the Voltage Cells VCs are connected in series such that each cell is adding to the overall voltage of the Voltage Module VM. In other words, the highest voltage achievable from the Voltage Module VM is the direct sum of voltages from all the Voltage Cells VCs within the Voltage Module VM, i.e. $V_m.N_m$ in the $m^{th}$ Voltage Module VM.

Within each Voltage Module VM, two sets of switches in Series-S and Series-J respectively, and designated by $S_1$, $S_2$, $S_3$, . . . $S_i$ . . . where i=1 to $N_m+1$, and $J_1$, $J_2$, $J_3$, . . . $J_i$ . . . where i=1 to $N_m+1$ respectively, and connected in parallel with the series of Voltage Cells VCs such that at any time each of the two output terminals $T_{o1}$ and $T_{o2}$ of the Voltage Module VM can be connected to any one of the connection nodes $T_1$, $T_2$, $T_3$ . . . $T_i$ where i=1 to $N_m+1$ within the Voltage Module VM.

For all Voltage Cells VCs in all Voltage Modules VMs, i.e. $VC_{mc}$, for $c^{th}$ VC in $m^{th}$ VM, for c=1 to $N_m$, m=1 to $M_{VM}$, the nominal voltages $V_{mc}$ are identical in waveform and in phase but are of different magnitudes between the Voltage Modules VMs. However the ratios of the magnitudes of voltage $V_m$ of the voltage cells between the Voltage Modules are uniquely defined by present invention, and according to the number of Voltage Modules and numbers of Voltage Cells VCs in each of all the Voltage Modules as $V_1:V_m=1:\Pi(N_i+1)$ where i=1 to m−1, m=1 to $M_{VM}$ (Π denoting the product of the series).

Further by turning on the appropriate switches of the S-series and J-series, the output of the $m^{th}$ Voltage Module $VM_m$, i.e. $V_{mo}$, can be varied monotonically from $-V_mN_m$ to $+V_mN_m$ in practically equal steps of $V_m$.

By combining all the Voltage Modules, and by turning on the appropriate switches, the output of the Digital Voltage Controller $V_{DVC}$ can be varied monotonically from $-\Sigma V_mN_m$ to $+\Sigma V_mN_m$ in practically equal steps of $V_1$.

It is possible by suitable design all voltage cells are in series aiding so that the resultant current always flows in one direction. However by the combined switching actions of the S-series and J-series switches the output from a Voltage Module can vary between opposite polarities. Consequently in combination with other Voltage Modules which might also have either polarities, it can be expected that some of the voltage cells need to handle currents flowing in either directions. In that case, these voltage cells would need to be made to allow bidirectional current flow, and hence bidirectional power flow.

There is another practical issue to be considered. Due to various reasons, such as the tolerance in physical implementation of the Voltage Cells, partly due to the uncertainty in voltage measurements, the loading effect on the Voltage Cells whenever load current is drawn from the Digital Voltage Controller DVC at $V_{DVC}$, and the voltage drop on the switches, etc., there is likely some departure in the contribution of $V_{mc}$ from the nominal value.

Designating this departure by $\delta V_{mc}$, and assuming $\delta V_a$ is the largest voltage deviation for any of ALL Voltage Cells VCs in all Voltage Modules VMs, i.e. the largest among all $\delta V_{mc}$, c=1 to $N_m$, m=1 to $M_{VM}$, the maximum departure of $V_{mo}$, voltage output from $m^{th}$ Voltage Module $VM_m$ is $\delta V_{mo}$, then $\delta V_{mo}=\delta V_a \times N_m$.

Therefore, in comparison to the nominal voltage values, the deviation of $V_{DVC}$, the output of the Digital Voltage Controller DVC, is $\delta V_{DVC}$, and the maximum value of $\delta V_{DVC}=\Sigma\delta V_{mo}=\Sigma\delta V_a \times N_m=\delta V_a \times \Sigma N_m$ where m=1 to $M_{VM}$.

Note that $\delta V_{mc}$, $\delta V_a$, $\delta V_{mo}$, and $\delta V_{DVC}$ can be of either positive or negative values. However for the estimate of their largest possible values, we shall take from here their absolute values, i.e. the magnitudes only.

If the steps are controlled such that each time one and only one Voltage Cell VC in any of the Voltage Modules VMs is added to or removed from contributing to the output of the Voltage Module VM, the maximum change in the voltage deviation from the nominal, at each voltage step, for the Voltage Module would be $\delta V_a$, and total change in the voltage deviation from the nominal voltage $V_{DVC}$ for the Digital Voltage Controller, is $\delta V_{DVC}=|\delta V_a| \times M$ In order to make sure that the voltage change under control is monotonic, it is required that $|\delta V_{DVC}|<V_1$ i.e. $|\delta V_a| \times M_{VM}<V_1$, i.e. $|\delta V_a|<V_1/M_{VM}$ In other words, the deviation of voltage of any of the Voltage Cells VCs would need to be less than the nominal voltage of the smallest (least significant) Voltage Cell divided by the total number of Voltage Modules VMs.

Hence to maintain monotonicity in practice the voltages of the Voltage Cells VCs between the Voltage Modules VMs are allowed to bear the ratios $V_1:V_m=1:[\Pi(N_i+1)]\pm|\delta V_a|/V_1=1:[\Pi(N_i+1)]\pm 1/M_{VM}$ where i=1 to m−1, for m=1 to $M_{VM}$.

Shown in FIG. 2 there is also the Control Module CM, implemented in any suitable logic, to control the Voltage Modules VMs by providing digital control signals $CS_S$ and $CS_J$ to the Voltage Modules VMs to turn on and to turn off the Series-S and Series-J switches respectively.

Figure 3:
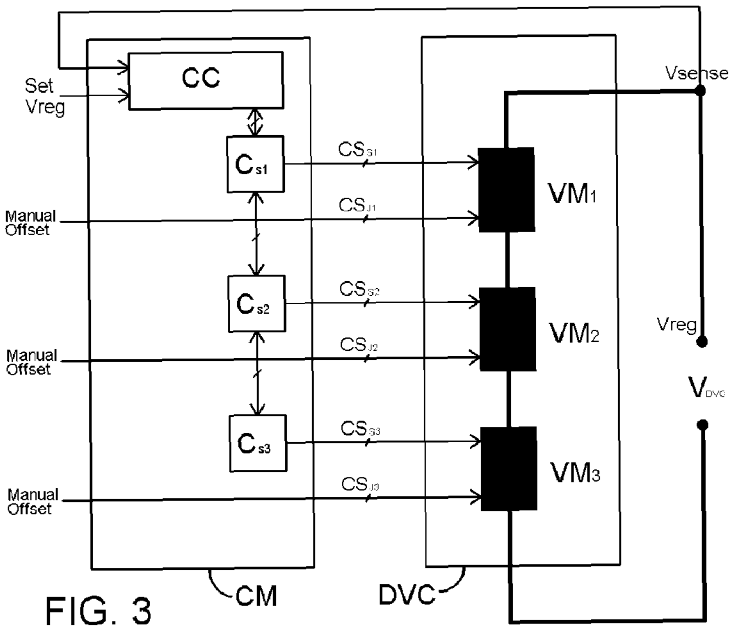
FIG. 3 shows how the digital voltage controller together with the control module is configured as a voltage regulator as an embodiment of the present invention.

FIG. 3 depicts the circuit architecture of a voltage regulator implemented with Digital Voltage Controller DVC together with the Control Module CM, which may in general be implemented in any suitable logic for providing control signals for the Digital Voltage Controller DVC. Shown the output of the voltage regulator $V_{reg}$, which is also the output of the Digital Voltage Controller DVC, i.e. $V_{DVC}$, is measured as $V_{sense}$, as a voltage sensing signal representative of the magnitude of the output voltage. $V_{sense}$ is compared to the set-point of the nominal regulator voltage $V_{reg}$ at the Counter Controller CC in the Control Module CM. The Counter Controller CC is coupled to a series of cascaded Modulo-M up-down counters, $C_{S1}$, $C_{S2}$ and $C_{S3}$, where M equals the number of corresponding switches under control by each counter. Note that by connecting counters $C_{S1}$, $C_{S2}$, and $C_{S3}$ in cascade, the total number of counting states is equal to the product of the numbers of S-series switches in Voltage Modules $VM_1$, $VM_2$ and $VM_3$ respectively. From counter $C_{S1}$ digital control signals $CS_{S1}$ are coupled to the Series-S switches in the Voltage Module $VM_1$, the number of counter states of $C_{S1}$ being the same as the number of Series-S switches in the Voltage Module $VM_1$, and any time only one of the signal lines of $CS_{S1}$ is active corresponding to one of the counting states of the counter $C_{S1}$. Similarly, from counter $C_{S2}$ digital control signals $CS_{S2}$ are coupled to the Series-S switches in the Voltage Module $VM_2$, and from counter $C_{S3}$ digital control signals $CS_{S3}$ are coupled to the Series-S switches in the Voltage Module $VM_3$.

On the other hand, Series-J switches in the Voltage Modules $VM_1$, $VM_2$ and $VM_3$ are manually set through control signal lines of $CS_{J1}$, $CS_{J2}$ and $CS_{J3}$ respectively to shift the output voltage from each of the Voltage Modules $VM_1$, $VM_2$ and $VM_3$ as required by the design. In the case the Series-J switches are to be permanently set, these switches can be replaced by hard-wiring, i.e. shorting for closed switches and opening for open switches, within the Voltage Modules VMs as will be shown by an exemplary embodiment of the invention to be described next with reference to FIG. 4.

In operation, when $V_{reg}$ is lower than the set-point by a pre-defined amount the Counter Control CC will trigger the cascaded counters to count-up so that $V_{DVC}$ or $V_{reg}$ is raised. When $V_{reg}$ is higher than the set-point by a pre-defined amount the Counter Control CC will trigger the cascaded counters to count-down so that $V_{DVC}$ or $V_{reg}$ is lowered. $V_{reg}$ is thus controlled to a value close to the set-point despite of any variations in the supply voltage at the input of the voltage regulator or any variations of the load at the output of the voltage regulator.

Figure 4:
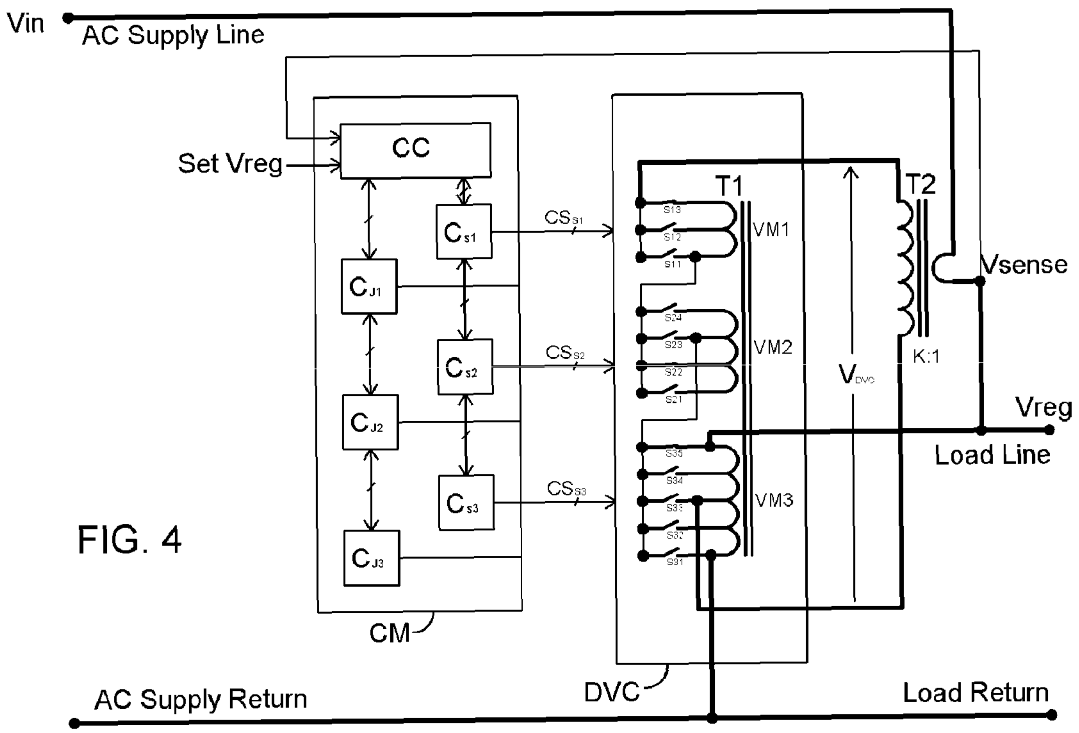
FIG. 4 shows the circuit architecture of an AC voltage regulator deploying a digital voltage controller as an embodiment of the present invention.

Referring to FIG. 4, which shows the circuit architecture of an AC voltage regulator implemented as an embodiment of the present invention.

The Digital Voltage Controller DVC basically consists of a multi-coil multi-tapped power transformer T1. As shown there are three transformer coils acting as Voltage Modules VMs designated by $VM_1$, $VM_2$ and $VM_3$, respectively. Here $M_{VM}$, the total number of Voltage Modules VMs is therefore 3. $VM_1$ has 2 segments of the corresponding transformer coil and therefore 2 Voltage Cells VCs, similarly $VM_2$ has 3 Voltage Cells VCs while $VM_3$ has 4 Voltage Cells VCs. Each Voltage Cell corresponds to a segment of the transformer coil, each segment bearing the same number of windings within each coil. The Voltage Cells bear the voltage ratios 1:3±0.33:12±0.33 between the Voltage Modules $VM_1$, $VM_2$ and $VM_3$. The transformer taps are switched on and off by Series-S switches under the digital control signals from the Control Module CM.

The 3 taps of coil $VM_1$ are connected to switches by $S_{11}$, $S_{12}$ and $S_{13}$ respectively. The 4 taps of coil $VM_2$ are connected to switches $S_{21}$, $S_{22}$ and $S_{23}$ and $S_{24}$ respectively. The 5 taps of coil $VM_3$ are connected to switches $S_{31}$, $S_{32}$ and $S_{33}$, $S_{34}$ and $S_{35}$ respectively.

As shown in FIG. 4 the output of the Digital Voltage Controller DVC is connected to primary side of transformer T2 which acts as a compensation transformer by which its secondary side is connected between the AC supply line and the output of the AC voltage regulator, i.e. the Load Line. It can be easily figured out that the output from the DVC is as tabled below:

| States of Counters | | | Switch | Output |
|---|---|---|---|---|
| $C_{S3}$ Quinary | $C_{S2}$ Quaternary | $C_{S1}$ Ternary | States Decimal | $V_{DVC}$ $V_{reg}/48$ |
| 0 | 0 | 0 | 0 | −30 |
| 0 | 0 | 1 | 1 | −29 |
| 0 | 0 | 2 | 2 | −28 |
| 0 | 1 | 0 | 3 | −27 |
| 0 | 1 | 1 | 4 | −26 |
| 0 | 1 | 2 | 5 | −25 |
| 0 | 2 | 0 | 6 | −24 |
| 0 | 2 | 1 | 7 | −23 |
| 0 | 2 | 2 | 8 | −22 |
| 0 | 3 | 0 | 9 | −21 |
| 0 | 3 | 1 | 10 | −20 |
| 0 | 3 | 2 | 11 | −19 |
| 1 | 0 | 0 | 12 | −18 |
| 1 | 0 | 1 | 13 | −17 |
| 1 | 0 | 2 | 14 | −16 |
| 1 | 1 | 0 | 15 | −15 |
| 1 | 1 | 1 | 16 | −14 |
| 1 | 1 | 2 | 17 | −13 |
| 1 | 2 | 0 | 18 | −12 |
| 1 | 2 | 1 | 19 | −11 |
| 1 | 2 | 2 | 20 | −10 |
| 1 | 3 | 0 | 21 | −9 |
| 1 | 3 | 1 | 22 | −8 |
| 1 | 3 | 2 | 23 | −7 |
| 2 | 0 | 0 | 24 | −6 |
| 2 | 0 | 1 | 25 | −5 |
| 2 | 0 | 2 | 26 | −4 |
| 2 | 1 | 0 | 27 | −3 |
| 2 | 1 | 1 | 28 | −2 |
| 2 | 1 | 2 | 29 | −1 |
| 2 | 2 | 0 | 30 | 0 |
| 2 | 2 | 1 | 31 | 1 |
| 2 | 2 | 2 | 32 | 2 |
| 2 | 3 | 0 | 33 | 3 |
| 2 | 3 | 1 | 34 | 4 |
| 2 | 3 | 2 | 35 | 5 |
| 3 | 0 | 0 | 36 | 6 |
| 3 | 0 | 1 | 37 | 7 |
| 3 | 0 | 2 | 38 | 8 |
| 3 | 1 | 0 | 39 | 9 |
| 3 | 1 | 1 | 40 | 10 |
| 3 | 1 | 2 | 41 | 11 |
| 3 | 2 | 0 | 42 | 12 |
| 3 | 2 | 1 | 43 | 13 |
| 3 | 2 | 2 | 44 | 14 |
| 3 | 3 | 0 | 45 | 15 |
| 3 | 3 | 1 | 46 | 16 |
| 3 | 3 | 2 | 47 | 17 |
| 4 | 0 | 0 | 48 | 18 |
| 4 | 0 | 1 | 49 | 19 |
| 4 | 0 | 2 | 50 | 20 |
| 4 | 1 | 0 | 51 | 21 |
| 4 | 1 | 1 | 52 | 22 |
| 4 | 1 | 2 | 53 | 23 |
| 4 | 2 | 0 | 54 | 24 |
| 4 | 2 | 1 | 55 | 25 |
| 4 | 2 | 2 | 56 | 26 |
| 4 | 3 | 0 | 57 | 27 |
| 4 | 3 | 1 | 58 | 28 |
| 4 | 3 | 2 | 59 | 29 |

As shown by the table, by controlling the switch states of the 3 sets of Series-S switches in the 3 Voltage Modules VMs for a total of 60 states, the voltage output from the DVC can be stepped from −30 to +29 in steps of one, each step being 1/48 of the regulator output voltage, i.e. $V_{reg}/48$.

Referring back to FIG. 4,

The Series-S switches are driven by the counters which are designated as $C_{S1}$ for $VM_1$: Ternary (Modulo-3) up-down counter $C_{S2}$ for $VM_2$: Quaternary (Modulo-4) up-down counter $C_{S3}$ for $VM_3$: Quinary (Modulo-5) up-down counter The three counters are cascaded to count through a total of 5×4×3=60 counting states.

The polarity of compensation transformer T2 is chosen such that when $V_{reg}$ is lower than the set-point by a pre-defined amount the Counter Control CC will trigger the cascaded counters to count-up so that an increasing $V_{DVC}$ is generated and added through the secondary side of the compensation transformer T2 resulting a higher $V_{reg}$. Similarly when $V_{reg}$ is higher than the set-point by a pre-defined amount the Counter Control CC will trigger the cascaded counters to count-down so that a decreasing $V_{DVC}$ is generated and added through the secondary side of the compensation transformer T2 resulting a lower $V_{reg}$. $V_{reg}$ is thus controlled to a value close to the set-point despite of any variations in the supply voltage at the power input of the AC voltage regulator or any variations of the load at the output of the AC voltage regulator.

The scale of compensation is dependent on K, turns ratio of the primary to the secondary of the compensation transformer T2. A larger K means a smaller scale of compensation, and a smaller K means a larger scale of compensation. As an example, for a nominal Vreg=220 volt, K=6, theoretically the AC voltage regulator will be able to maintain an output accuracy of ±0.34% for supply voltage variation in the range ±20%. Similarly, for K=3, the AC voltage regulator will be able to maintain an output accuracy of ±0.68% for supply voltage variation in the range ±40%.

Note that Series-J switches are not deployed in the above embodiment. As shown in FIG. 4, one output terminal of each Voltage Module VM is hard-wired instead of being connected through one of the Series-J switches to the corresponding transformer tap, while the other output terminal is selectively connected to the transformer taps by the Series-S switches. In a modified embodiment for increased precision of control, Series-J switches can be deployed to raise the number of controlled steps of the Digital Voltage Controller DVC. When Series-J switches are deployed as depicted in FIG. 3, the total number of switch states achievable will be 119 and thus the voltage output from the DVC can be stepped from −59 to +59 in steps of one, each step being 1/48 of the regulator output voltage, i.e. $V_{reg}/48$.

Note also that there is much more room for variation in the embodiments of the present invention. Both the number of Voltage Modules VMs and the number of Voltage Cells VCs in each Voltage Module VM can be chosen to suit individual design considerations, such as control accuracy, control range, number of transformer coils (the Voltage Cells VCs and Voltage Modules VMs) and number of switches needed, control circuit complexity, system stability, total implementation cost, etc. Room of variation available in the present invention provides much design flexibility in choosing the best circuit topology.

Figure 5:
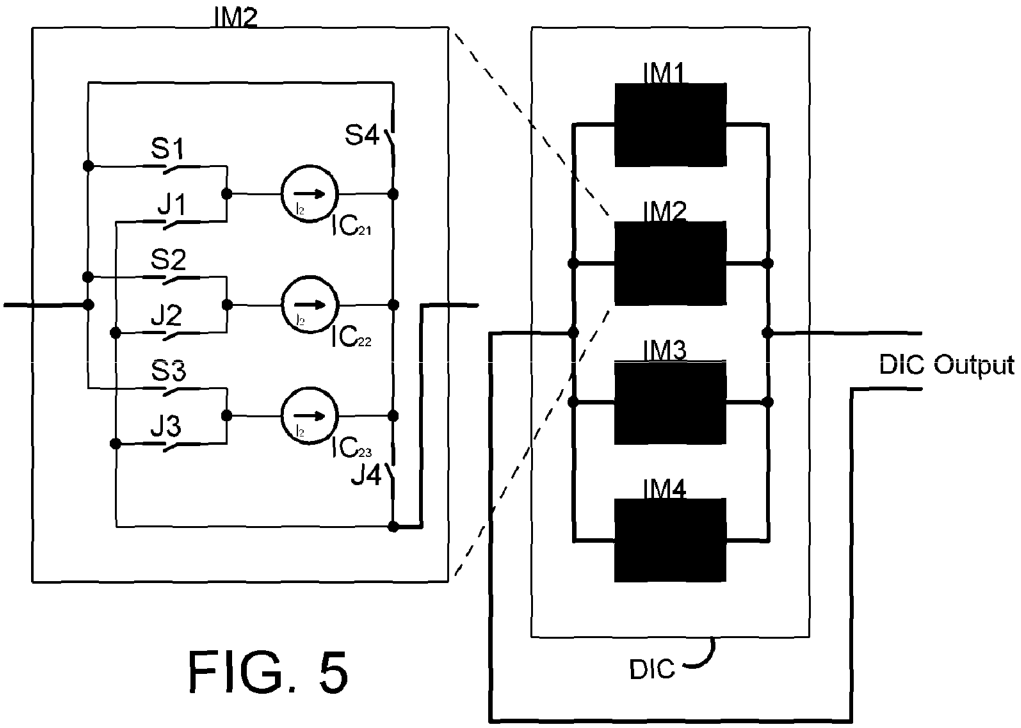
FIG. 5 shows the basic architecture of a digital current controller.

By duality property of electrical circuits, all circuit principles described for voltage control in this application can be applied also to current control. As an exemplary embodiment of present invention the basic architecture of a Digital Current Converter DIC is shown in FIG. 5. The Digital Current Controller DIC consists of four Current Modules $IM_1$, $IM_2$, $IM_3$ and $IM_4$ which are connected in parallel, in contrary to the Digital Voltage Controller whereby the Voltage Modules are connected in series. For the purpose of illustration, the second Current Module $IM_2$ is shown as an example with the details. The Current Module $IM_2$ consists of three Current Cells $IC_{21}$, $IC_{22}$ and $IC_{23}$ which source each a constant current $I_2$ and are connected together at one terminal with the same polarity. By action of the switches $S_1$ to $S_4$ and $J_1$ to $J_4$, the Current Module $IM_2$ can be controlled to deliver currents from $-3I_2$ to $+3I_2$. Following the same principle as the Digital Voltage Controller and with voltage-current duality in mind, it can be deduced that a high-efficiency digital current controller capable of providing monotonically-varying stepwise current can be achieved.

Although the present invention and its advantages have been described in detail, it should be understood that various changes, substitutions, and alterations can be made therein without departing from the spirit and scope of the invention as described. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the invention.

The invention claimed is:

1. A voltage controlling apparatus, comprising:

a number of at least one two-terminal voltage modules connected in series;

between the two terminals of each voltage module a number of at least one two-terminal voltage cells connected in series, wherein the voltage magnitudes of the voltage cells are equal;

wherein the magnitudes of the voltage cells between the voltage modules bear ratios $V_1$: $V_2$: $V_3$: . . . $V_m$: . . . , in an order of increasing magnitude, $V_1$: $V_m$=1: $\Pi(N_i+1)$ where i=1 to m−1, $V_m$ is the voltage magnitude of one single voltage cell of the $m^{th}$ voltage module, $N_i$, is the number of voltage cells in the $i^{th}$ voltage module, Πis a mathematical multiplication operator;

in each voltage module a plurality of switches controllable to connect a selected number of voltage cells in series to the two terminals of the voltage module;

a control module for controlling said switches.

2. The voltage controlling apparatus of claim 1, wherein the voltages of the voltage cells are identical in waveform and in phase.

3. The voltage controlling apparatus of claim 1, wherein the in each voltage module the voltage cells are connected in series aiding.

4. The voltage controlling apparatus of claim 1, wherein the number of switches in each voltage module is $N_i$+1.

5. The voltage controlling apparatus of claim 4, wherein the control module is comprising an analog-to-digital converter, wherefrom $N_i$+1 digital outputs are configured to drive the switches in the $i^{th}$ voltage module.

6. The voltage controlling apparatus of claim 5, wherein the analog-to-digital converter is comprising a plurality of counters connected in cascade, the counters being driven to count up or down according to an analog signal.

7. The voltage controlling apparatus of claim 6, wherein one counter is coupled to one voltage module, and the counter coupled to the $i^{th}$ voltage module is of Modulo−($N_i$+1).

8. A method of voltage control, said method comprising the steps of:

connecting a number of at least one two-terminal voltage modules in series;

between the two terminals of each voltage module connecting a number of at least one two-terminal voltage cells in series, wherein the voltage magnitudes of the voltage cells are equal;

wherein the magnitudes of the voltage cells between the voltage modules bear ratios $V_1$: $V_2$: $V_3$: . . . , $V_m$: . . . , in an order of increasing magnitude, $V_1$: $V_m$=1:$\Pi(N_i+1)$ where i=1 to m−1, where $V_m$ is the voltage magnitude of one single voltage cell of the $m^{th}$ voltage module, $N_i$ is the number of voltage cells in the $i^{th}$ voltage module, Π is a mathematical multiplication operator;

in each voltage module connecting a selected number of voltage cells in series to the two terminals of the voltage module by $N_i$+1 controllable switches;

controlling said switches by a control module.

9. The method of claim 8, wherein voltages of the voltage cells are identical in waveform as well as phase, and in each voltage module the voltage cells are connected in series aiding.

10. The method of claim 8, comprising a further step of converting an analog control voltage to a plurality of digital signals, wherein the plurality of digital signals are coupled to drive the switches in each of the voltage modules.

11. The method of claim 10, wherein the step of converting the analog control voltage to the plurality of digital signals is by driving a plurality of counters connected in cascade, counting up or down according to the difference between the control voltage and a reference voltage.

12. The method of claim 11, wherein the counter coupled to the $i^{th}$ voltage module is of Modulo−($N_i$+1).

* * * * *